United States Patent

[11] 3,581,647

| | | |
|---|---|---|
| [72] | Inventor | Herbert Maronde<br>Dusseldorf, Germany |
| [21] | Appl. No. | 736,373 |
| [22] | Filed | June 12, 1968 |
| [45] | Patented | June 1, 1971 |
| [73] | Assignee | Robot Foto and Electronic GmbH 4 Co.<br>KG, Dusseldorf, Germany<br>a part interest |
| [32] | Priority | June 19, 1967 |
| [33] | | Germany |
| [31] | | P 15 97 378.1 |

[54] RELEASING DEVICE FOR CAMERAS WITH AUTOMATIC FILM ADVANCE
3 Claims, 1 Drawing Fig.

[52] U.S. Cl............................................. 95/53E, 95/3/AC
[51] Int. Cl............................................. G03b 9/00
[50] Field of Search............................................. 95/31 (AC), 53 (E)

[56] References Cited
UNITED STATES PATENTS

| 3,348,462 | 10/1967 | Fahlenberg.................. | 95/53 |
| 3,416,424 | 12/1968 | Harvey......................... | 95/31 |
| 3,448,670 | 6/1969 | Suzuki........................... | 95/31 |

FOREIGN PATENTS

| 809,129 | 3/1951 | Germany..................... | |

Primary Examiner—Samuel S. Matthews
Assistant Examiner—Richard L. Moses
Attorney—Darbo, Robertson and Vandenburgh ABSTRACT: A relay is employed which has normally open contacts and normally closed contacts. A first series electrical circuit is formed from a source of electrical power through a manually operable switch, the normally closed contacts, and a solenoid for actuating the camera release button. A second series electrical circuit is formed through the relay coil, the flashlight contacts of the camera (which are closed when the shutter is operated) and the source of power. A capacitor and adjustable resistor are connected in series across the relay coil. The normally open relay contacts are connected in a series circuit with a signal light and the source of power.

Patented June 1, 1971
3,581,647
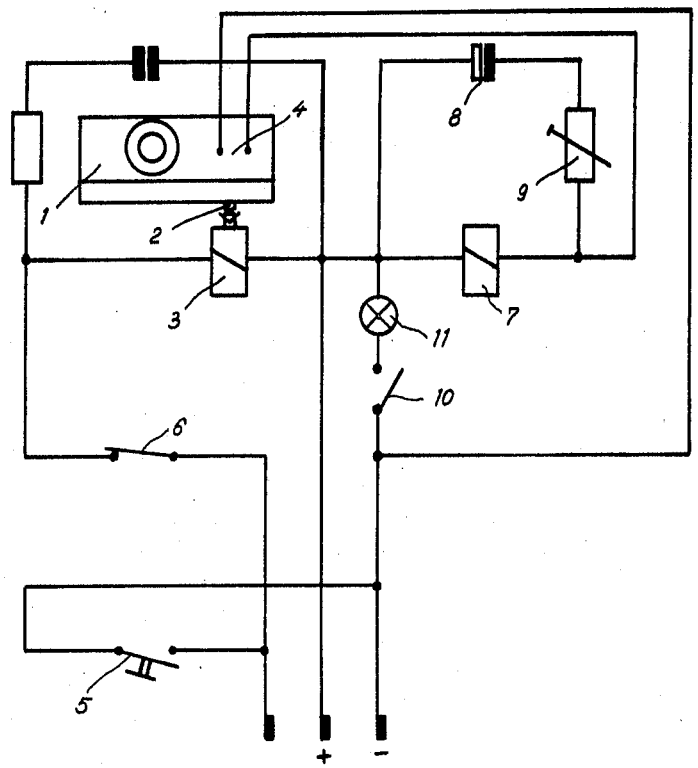

RELEASING DEVICE FOR CAMERAS WITH AUTOMATIC FILM ADVANCE

BACKGROUND AND SUMMARY OF THE INVENTION

The present invention relates to a releasing device with automatic film advance. Commonly, the shutter release of a camera of the type indicated is accomplished by a tripping magnet acting on a shutter release button of the camera. Cameras are known which will make only a single photograph upon actuation of the release button, independently of the duration of excitation of the tripping magnet, or by a change over of the camera mechanical system it is possible to make a photographic series at predetermined intervals of time, as long as the release button is being actuated. When changing from single photographs to serial photographs a change over of the camera mechanical system is required. This gives rise to difficulties, if the camera is built in in some manner and is relatively inaccessible. Moreover, it is difficult to vary the intervals of time for serial photographs within certain limits.

It is the object of the present invention, to provide an electromagnetic releasing device, wherein by actuation of a tripping switch, without changing over the camera mechanically, single or serial photographs can optionally be made, and the intervals of time with serial photographs can be adjusted. To this end, the starting basis is to use a camera, having a wipe contact (flash contact) actuated by the shutter operation, as is well-known in the art.

According to the present invention, with a camera of the type indicated this object is solved by directing the electric circuit to be closed by a tripping switch, of the tripping magnet via a break contact of a relay which is connectable by the wipe contact. With such an arrangement, the electric circuit of the tripping magnet is interrupted with each shutter operation by opening of the break contact, and is closed again after deenergization of the relay, provided the tripping switch is still being actuated. Thus, by momentary actuation of the tripping switch single photographs can be made. Serial photographs will, however, be made automatically as long as the tripping switch is maintained in the on-position. The interval of time between successive photographs is dependent on the breaking delay of the relay. In further modification of the invention this breaking delay can be made adjustable by having a parallel connection of an adjustable R-C element with the relay. It is expedient to have a signal supplied by a make contact of the relay, whereby the function of the releasing device can be readily monitored.

DESCRIPTION OF THE DRAWING

The drawing is a schematic diagram of an embodiment of the invention.

DESCRIPTION OF SPECIFIC EMBODIMENT

Reference numeral 1 designates a known type of camera which is provided with an automatic film advance and automatic shutter winding. A tripping magnet 3 acts on the release button 2 of the camera 1. The shutter of camera 1 includes a wipe contact (or shutter switch means) 4 which is closed temporarily during shutter operation and is known to be normally used for causing the exposure of a flash lamp.

The tripping magnet or solenoid 3 has a series electrical circuit by which it is connected to a source of power (+, −). This circuit includes a tripping switch 5 designed as key. The electric circuit of the tripping magnet 3 also includes a normally closed-circuit contact 6 of a relay coil 7. A second series electrical circuit connects coil 7 and wipe contacts 4 with the source of power. Upon shutter operation, the relay coil 7 is temporarily energized through the wipe contact 4. At the same time a capacitor 8 of a RC-element 8, 9 connected in parallel to the relay coil 7, is charged. The resistor 9 of the RC-element is adjustable. The relay has a normally open contact 10 which is closed (made) when the coil 7 is energized. The closing of contact 10 energizes a signal lamp 11.

When actuating the tripping switch 5, a shutter release is effected by the tripping magnet 3, and subsequently, the automatic film advance and rewinding of the shutter. During the shutter operation relay coil 7 is energized by the closing of the wipe contact 4. Energizing coil 7 opens the closed-circuit contact 6 to deenergize magnet 3 and closes the contact 10 to switch on the signal lamp 11. After a delay time dependent on the adjustment of the RC-element (8, 9) the relay 7, 6, 10 returns to its original position at which the closed-circuit contact 6 is again closed. Prior to that, the tripping switch 5 may have been released, so that the tripping magnet 3 is excited only after reactuation of the tripping switch 5 for the next following single photograph. However, if the tripping switch 5 is kept closed, until the relay 7 has gone off and the closed-circuit contact 6 been closed again, the next following excitation of the tripping magnet 3 and the next following photograph will be immediately effected. This automatic sequence of exposures (serial photographs) is effected as long as the tripping switch 5 is maintained closed. The intervals of time of the serial photographs depend on the adjustment of the resistor 9 effecting the charging of the capacitor 8, the fixed duration of contact of the wipe contact 4 in connection with the resistor 9 determining the magnitude of charging of the capacitor 8, on which in turn the deenergization delay of the relay 7 is dependent.

Since the tripping magnet 3 is only supplied with relatively short switching pulses, it may be sized relatively small, without fear of undue heating.

The wipe contact of the shutter may be designed such that it remains closed until operation of the shutter is terminated and is opened with the immediately automatically effected rewinding of the shutter.

I claim:

1. In a camera apparatus having a solenoid to actuate the shutter, and a series electrical circuit to energize the solenoid which circuit includes a tripping switch, the improvement comprising:

shutter switch means operatively connected to the shutter for forming an electrical connection when the shutter is operated;

a relay having a coil and contacts which are normally closed and are opened upon the energization of the coil, said contacts being in said series circuit so that the solenoid is not energized when the contacts are open; and circuit means connecting said coil and said shutter switch means for energizing said coil when said shutter switch means forms said electrical connection, said circuit means including means for delaying the opening of the relay contacts upon the energizing of the coil, the last means comprising an adjustable resistance-capacitor device connected in parallel with said coil.

2. In an apparatus as set forth in claim 1, wherein said relay has a second set of contacts which are normally open and are closed when said coil is energized;

a signal element; and circuit means connecting said second set of contacts and said element for energizing said element when said second set of contacts are closed.

3. In a camera apparatus having a solenoid to actuate the shutter, and a series electrical circuit to energize the solenoid which circuit includes a tripping switch, the improvement comprising:

shutter switch means operatively connected to the shutter for forming an electrical connection when the shutter is operated;

a relay having a coil and contacts which are normally closed and are opened upon the energization of the coil, said contacts being in said series circuit so that the solenoid is not energized when the contacts are open, said relay having a second set of contacts which are normally open and are closed when said coil is energized;

circuit means connecting said coil and said shutter switch means for energizing said coil when said shutter switch means forms said electrical connection;

a signal element; and circuit means connecting said second set of contacts and said element for energizing said element when said second set of contacts are closed.